United States Patent
Akyureklier et al.

(10) Patent No.: US 10,423,588 B2
(45) Date of Patent: Sep. 24, 2019

(54) ORCHESTRATED DISASTER RECOVERY

(71) Applicant: INTERNATIONAL BUSINESS MACHINES CORPORATION, Armonk, NY (US)

(72) Inventors: Ozan A. Akyureklier, Livingston, NJ (US); Ramandeep S. Arora, Overland Park, KS (US); Richard Edwin Harper, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1035 days.

(21) Appl. No.: 14/834,804

(22) Filed: Aug. 25, 2015

(65) Prior Publication Data
US 2017/0060975 A1    Mar. 2, 2017

(51) Int. Cl.
*G06F 11/20* (2006.01)
*G06F 16/182* (2019.01)

(52) U.S. Cl.
CPC ........ *G06F 16/184* (2019.01); *G06F 11/2028* (2013.01); *G06F 11/2035* (2013.01); *G06F 11/2048* (2013.01); *G06F 11/2097* (2013.01)

(58) Field of Classification Search
CPC ............. G06F 11/2097; G06F 11/2028; G06F 11/2035; G06F 11/2048; G06F 17/30082;
(Continued)

(56) References Cited

U.S. PATENT DOCUMENTS

| | | | | |
|---|---|---|---|---|
| 6,519,679 | B2 * | 2/2003 | Devireddy | G06F 3/0605 711/114 |
| 6,732,231 | B1 * | 5/2004 | Don | G06F 11/006 711/114 |

(Continued)

FOREIGN PATENT DOCUMENTS

| | | |
|---|---|---|
| EP | 2645253 B1 | 11/2014 |
| GB | 201219299 | 12/2012 |
| GB | 2497168 B | 6/2014 |

OTHER PUBLICATIONS

Timothy Wood et al., "PipeCloud: Using Causality to Overcome Speed-of-Light Delays in Cloud-Based Disaster Recovery", 13 pages.

*Primary Examiner* — James Trujillo
*Assistant Examiner* — Jessica N Le
(74) *Attorney, Agent, or Firm* — William Hartwell; Matthew M. Hulihan; Heslin Rothenberg Farley & Mesiti PC

(57) ABSTRACT

Orchestrated disaster recovery is provided in which replication volumes are automatically configured as part of a failover procedure. An example method includes obtaining replication volume configuration information identifying configuration of a replication volume in a data replication relationship in which data is replicated from a replication source to a replication target. The replication volume is configured for the replication source and replication volume remains at least partially non-configured for the replication target during data replication from the replication source to the replication target. Based on an indication of failover, the obtained configuration information is used in automatically configuring the replication volume for the replication target in preparation for use by application(s) of the replication target site. Automatically configuring includes configuring, for the replication volume, a volume group and a mount point.

15 Claims, 6 Drawing Sheets

(58) Field of Classification Search
CPC ......... G06F 17/30073; G06F 17/30215; G06F 16/119; G06F 16/184
USPC ........................................................ 707/634
See application file for complete search history.

(56) References Cited

U.S. PATENT DOCUMENTS

| | | | | |
|---|---|---|---|---|
| 7,613,806 | B2* | 11/2009 | Wright | G06F 11/1456 709/225 |
| 8,713,356 | B1* | 4/2014 | Chan | G06F 11/2247 714/6.1 |
| 2003/0126327 | A1* | 7/2003 | Pesola | G06F 3/0601 710/74 |
| 2003/0233518 | A1* | 12/2003 | Yamagami | G06F 11/2058 711/114 |
| 2004/0181707 | A1* | 9/2004 | Fujibayashi | G06F 11/2069 714/6.12 |
| 2005/0015407 | A1* | 1/2005 | Nguyen | G06F 11/2069 |
| 2007/0006018 | A1* | 1/2007 | Thompson | G06F 11/1466 714/6.12 |
| 2007/0192375 | A1* | 8/2007 | Nakatani | G06F 11/1662 |
| 2011/0099147 | A1* | 4/2011 | McAlister | G06F 17/30581 707/639 |
| 2011/0246813 | A1* | 10/2011 | Collier | G06F 11/2035 714/3 |
| 2012/0271797 | A1 | 10/2012 | Patil | |
| 2012/0284707 | A1 | 11/2012 | Janakiraman | |
| 2013/0145367 | A1* | 6/2013 | Moss | H04L 43/04 718/1 |
| 2013/0262801 | A1 | 10/2013 | Sancheti et al. | |
| 2013/0290542 | A1* | 10/2013 | Watt | H04L 51/22 709/226 |
| 2013/0339643 | A1 | 12/2013 | Tekade et al. | |
| 2016/0048408 | A1* | 2/2016 | Madhu | G06F 11/1458 718/1 |

* cited by examiner

ORCHESTRATED DISASTER RECOVERY

BACKGROUND

Some Disaster Recovery (DR) solutions involve storage replication using an asymmetric 'active/active' setup in which components at both the source and target sites are active. An example includes primary (source) and secondary (target) virtual machines that are active and online in the DR environment with at least a portion of storage of the replication source being replicated to the replication target. The use of active/active DR can help achieve cost effective DR in a cloud environment since some compute capacity of a DR-involved virtual machine is used for running other workloads when not in a failover situation. However, enhancements are needed for DR solutions and particularly with respect to orchestration of seamless failover to the secondary site in the event that the primary site experiences a catastrophic failure.

SUMMARY

Shortcomings of the prior art are overcome and additional advantages are provided through the provision of a method for automatically configuring replication volumes as part of a failover procedure, the method including: obtaining replication volume configuration information identifying configuration of at least one replication volume in a data replication relationship in which data is replicated from a replication source to a replication target, wherein the at least one replication volume is configured for the replication source and the at least one replication volume remains at least partially non-configured for the replication target during data replication from the replication source to the replication target; and based on an indication of failover from a replication source site to a replication target site, automatically configuring, using the obtained replication volume configuration information, the at least one replication volume for the replication target in preparation for use by an application of the replication target site, the automatically configuring including configuring, for the at least one replication volume, at least one volume group and at least one mount point.

Further, a computer system is provided that includes a memory and a processor in communications with the memory, wherein the computer system is configured to perform a method including obtaining replication volume configuration information identifying configuration of at least one replication volume in a data replication relationship in which data is replicated from a replication source to a replication target, wherein the at least one replication volume is configured for the replication source and the at least one replication volume remains at least partially non-configured for the replication target during data replication from the replication source to the replication target; and based on an indication of failover from a replication source site to a replication target site, automatically configuring, using the obtained replication volume configuration information, the at least one replication volume for the replication target in preparation for use by an application of the replication target site, the automatically configuring including configuring, for the at least one replication volume, at least one volume group and at least one mount point.

Yet further, a computer program product including a computer readable storage medium readable by a processor and storing instructions for execution by the processor is provided for performing a method that includes: obtaining replication volume configuration information identifying configuration of at least one replication volume in a data replication relationship in which data is replicated from a replication source to a replication target, wherein the at least one replication volume is configured for the replication source and the at least one replication volume remains at least partially non-configured for the replication target during data replication from the replication source to the replication target; and based on an indication of failover from a replication source site to a replication target site, automatically configuring, using the obtained replication volume configuration information, the at least one replication volume for the replication target in preparation for use by an application of the replication target site, the automatically configuring including configuring, for the at least one replication volume, at least one volume group and at least one mount point.

Additional features and advantages are realized through the concepts described herein.

BRIEF DESCRIPTION OF THE DRAWINGS

Aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

During Disaster Recovery (DR), mirrored volumes should be rapidly mounted and made available to the DR-involved machine(s) at the replication target (secondary) site. Conventional approaches do no not provide seamless automated facilities to orchestrate this and, as a consequence, the recovery requires significant time and effort. This works against achieving the goal of a rapid recovery.

Examples described herein are presented in the context of Global Mirror (GM) technology offered by International Business Machines Corporation, Armonk, N.Y., which is used only by way of specific non-limiting example. Aspects described herein are applicable to any replication technology involving storage volume(s) having data on source volumes of primary machine(s) at one site being replicated to target volume(s) of secondary machine(s) at a second (DR) site.

Figure 1A:
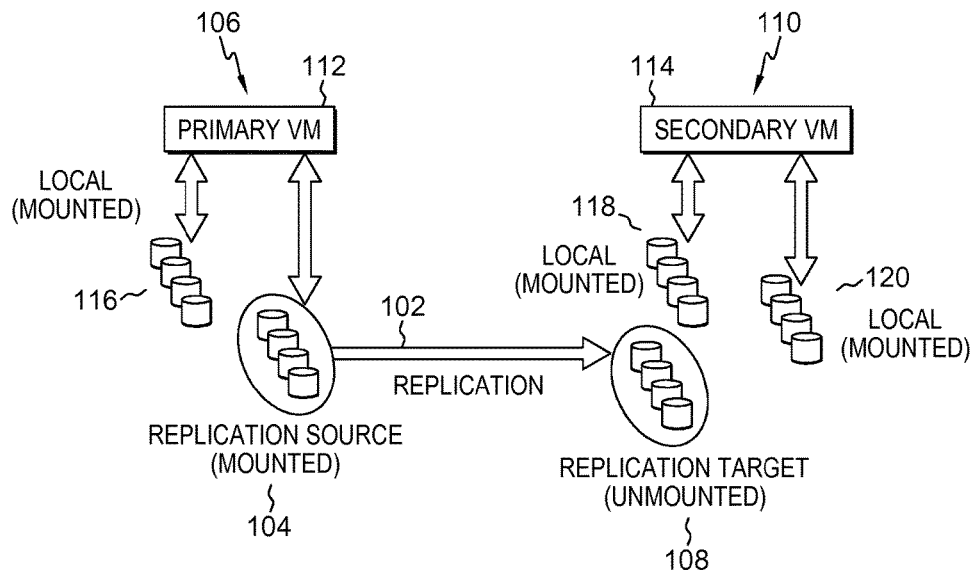
FIG. 1A depicts an example environment in which data replication occurs between a replication source and a replication target.

FIG. 1A depicts an example environment in which one-way data replication occurs between a replication source and a replication target in a pre-disaster scenario. Data replication occurs from replication source 104 at a primary site 106, also referred to herein as the replication source site, to a replication target 108 at a secondary site 110, also referred to herein as the replication target site. In practical situations, these sites will be located remote from each other, usually several hundreds or thousands of miles apart and in communication via one or more networks. Primary virtual machine(s) 112 at the primary site 106 and secondary virtual machine(s) 114 at the secondary site 110 are in an 'active/active' configuration, so named because the primary virtual machine(s) 112 are active as are the secondary virtual machine(s) 114, despite the secondary virtual machine(s) 114 having a primary role of serving as a backup in DR. For instance, secondary virtual machine(s) 114 can handle supplementary workloads like serving as test machines for a customer even though the primary role of the replication site is DR in the event of a failover.

The replication source site 106 has local storage 116 mounted for the primary virtual machine(s) 112. Also mounted are replication source devices 104, for which replication volume(s) involved in the replication relationship 102 are configured. Meanwhile the replication target site 110 has local storage 118 mounted as well as additional local storage 120 to support supplementary workloads. Both are mounted for the secondary virtual machine(s) 114. Replication target device(s) 108 are unmounted at this point. The replication volume(s) involved in the replication relationship 102 are configured for the replication target 108 insofar as the data of those volumes is being replicated from the mounted replication source 104 at the replication source site 106 to the unmounted replication target 108 at the replication target site. However at this point, the replication volumes remain at least partially non-configured for the replication target 108. For instance, when replication target 108 is unmounted, the replication volumes and specifically their proper mount points and other configuration is not generally known to the target operating systems (i.e. of the secondary virtual machine(s) 114) for the involved disks. Meanwhile, mirrored disk (e.g. Hdisk in these examples) names are likely different on the primary virtual machine(s) 112 from those on the secondary virtual machine(s) 114. Mere identification of Hdisk names is not enough to determine which volumes need to be mounted on the secondary virtual machine(s) 114 in the event of a failover. Moreover, the replication target volumes are not writable by the secondary virtual machine operating systems until failover, so changes by them prior to failover are not possible. Similar obstacles apply to GM universally unique identifiers (UUIDs) of the disks, as they are likely different on the primary virtual machine(s) 112 than on the secondary virtual machine(s) 114.

Figure 1B:
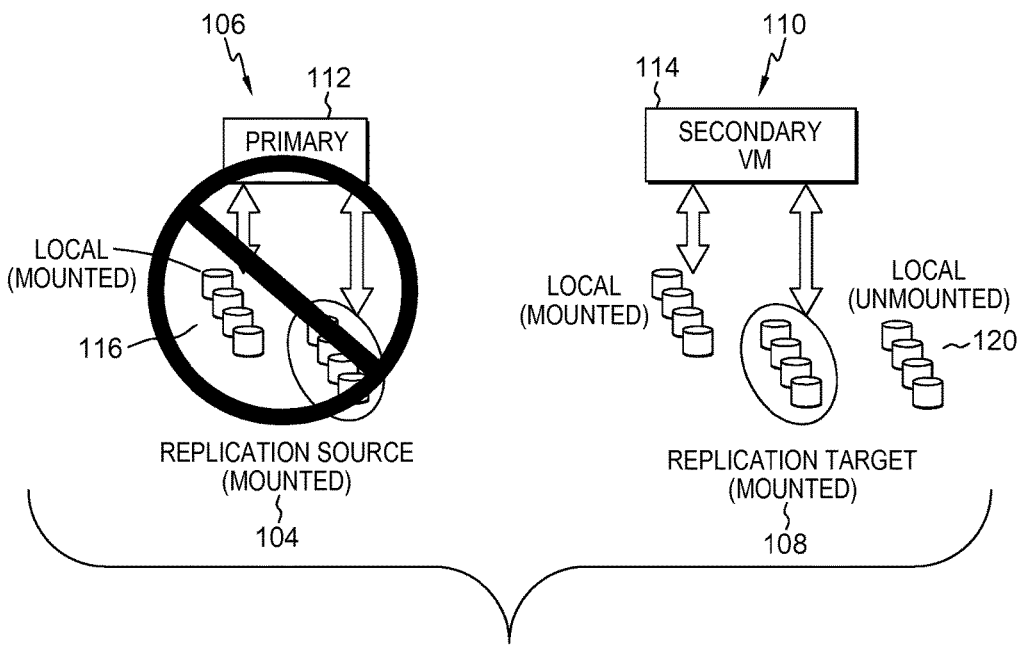
FIG. 1B. depicts the example environment of FIG. 1A after a disaster at the replication source site prompts a failover, in accordance with aspects described herein.

This can present problems when a disaster at the replication source site prompts a failover. An example of this is depicted in FIG. 1B, which presents features and reference numerals that correlate to those of FIG. 1A. In FIG. 1B, disaster 122 has rendered primary site 106 effectively offline or otherwise unable to handle its workload. A failover is to occur from the primary site 112 to the secondary site 110. As part of failover, and in accordance with aspects described herein, the replication target 108 is to become mounted for use by application(s) of the secondary site 110. Meanwhile, to the extent that there are mount point or other conflicts between the supplementary local storage 120 and the to-be-mounted replication target 108, it is desired that the supplementary local storage 120 be unmounted as indicated before the replication target 108 is mounted, in order to avoid those conflicts.

Though some detection and reconfiguration of mirrored disk-pairs may be performed manually, it involves interrogating multiple locations, for instance a storage area network (SAN) volume controller (SVC) and the primary and secondary logical partitions (LPARs), manually detecting and creating the mount points, and manually mounting the mirrored disks. This is not possible or practicable in a cloud environment because of the need to manually interrogate multiple locations and persist the information, the high probability of human error especially when computing the mount point and mirror mappings, and the desire to keep the information up to date and stored in a reliable repository accessible to the DR site. These factors are unworkable at cloud scale where attaining an acceptable and reasonable recovery time objective (RTO) is important.

Under an alternative operating system-provided init.d automount approach, a list of mount points and disks can be manually created and a mounting procedure can be executed on a system reboot. However, this approach does not take into account correlating the mount points with only Global Mirrored disks, and manual configuration is complicated as GM disks can change over the time, resulting in a high risk of failure. Also, it does not create logical volumes (LVs), volume groups (VGs), file systems (FSs) and mount points based on characteristics of a source logical partition, and manual intervention is needed to manually create the mount points.

In addition to drawbacks noted above, these approaches do not provide automatic unmounting of local file systems and mounting of replicated file system(s) on the secondary virtual machine(s) to maintain file system structure. For instance, on failover, local mounted storage, such as supplementary storage 120, may need to be at least partially unmounted if there are conflicts or it is generally desired to unmount the storage for efficiency or other reasons, before mounting the replication target.

Aspects described herein provide for orchestrated disaster recovery applicable in various environments including cloud environments. Scripts are run to automatically restore and configure replication volumes for a secondary/replication target site, for instance to configure them for secondary virtual machines of the secondary site so the virtual machines (and applications running therein) can use the volumes.

Features of the primary site detect which disks are involved in data replication relationship(s), and therefore are being replicated, and also detect which volume groups (VGs) those disks correspond to on a source virtual machine. Then they obtain only the information for volume groups that are replicated. Additional configuration information such as file system type, read/write options, disk size and automount options for each mount point/logical volume on those mirrored volume groups is also obtained. Disk mappings are detected for mirrored disks on primary and secondary virtual machine(s) and replication volume configuration information is automatically built from the aforementioned information. The replication volume configuration information can be used by a restore script at the replication target site to fully configure the replication volume(s) including the volume groups and mount points. The appropriate disks can be mounted at (or very near) the time of disaster. Recovery is thereby reliably provided and is suitable for large-scale DR, such as is needed in cloud environments.

As noted, aspects described herein obtain relevant information from several sources, specially build the appropriate configuration information and create metadata, and execute script(s) that use the specially built configuration information to create logical volumes, volume groups, file systems, and mount points for the relevant GM disks as are used in DR.

Metadata is captured that identifies the replication relationship(s). In some embodiments, the metadata is captured from a data source such as a configuration management database (CMDB) at a third location remote from the primary and secondary site. The metadata is used to build the configuration information usable for automated configuration of appropriate volumes at the secondary site for the secondary virtual machines. This also ensures that the mount points are created in a proper hierarchical order and are not mounted one over another. Metadata can be updated periodically or whenever relevant disk-related changes to GM occurs. The approach gives users flexibility by ignoring disks and corresponding volume groups, logical volumes, file systems and mount points that are not under GM protection. As we are concerned with GM disks, this provides an option to have asymmetric storage and file system layout for primary and secondary servers i.e. they need not be exactly the same.

As noted, a third source such as a configuration management database, can be interrogated to obtain mapping metadata relating disks in multiple operating systems to Global Mirrored disks. This feature is provided to facilitate DR orchestration as applied to cloud environments, and it in contrast to conventional approaches in current cloud environments, in which cloud users do not generally have access to this mapping metadata.

Figure 2:
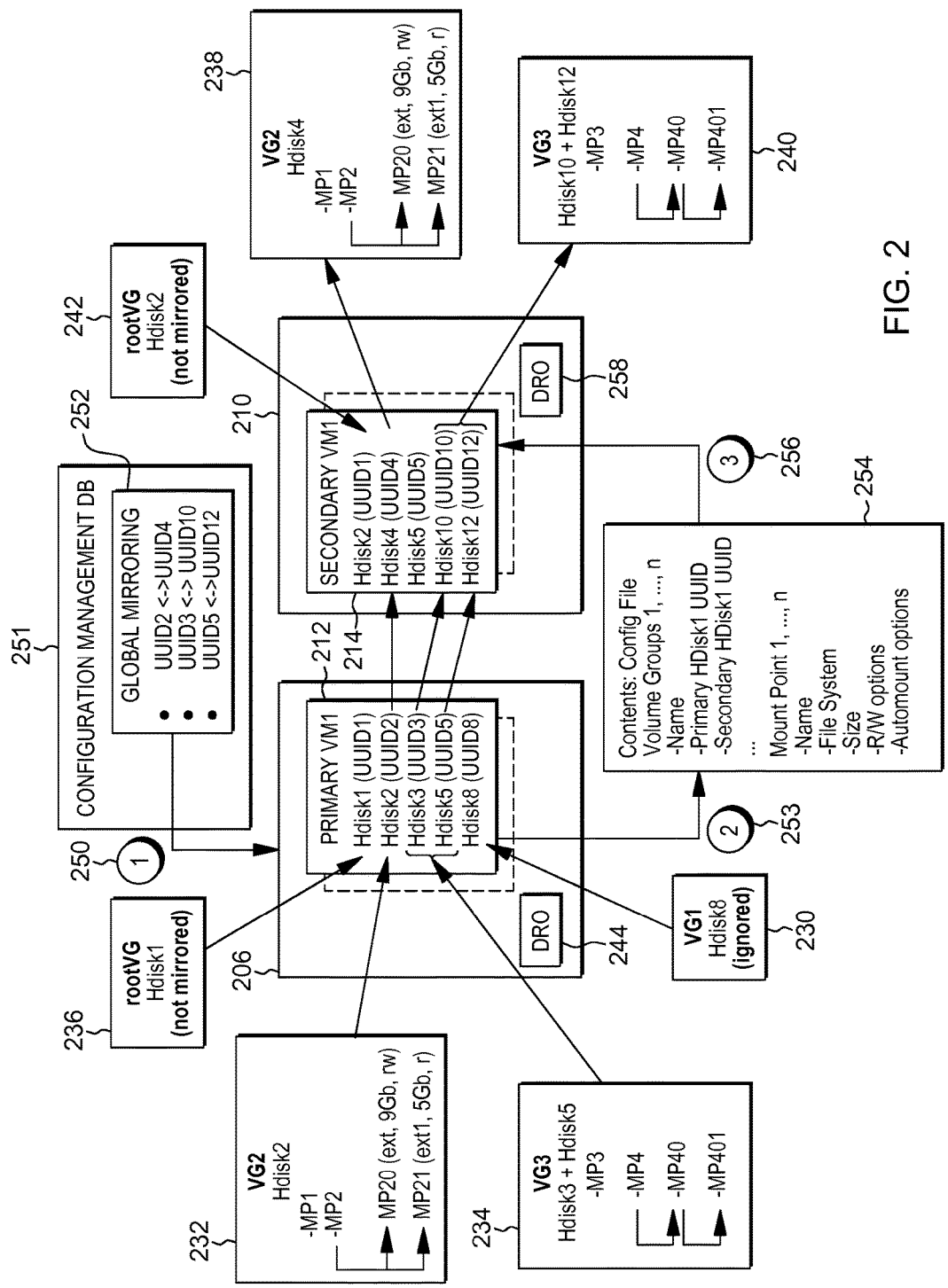
FIG. 2 presents a schematic diagram to illustrate aspects of disaster recovery orchestration in accordance with aspects described herein.

FIG. 2 presents a schematic diagram to illustrate aspects of disaster recovery orchestration as described herein. Primary virtual machine 212 at primary site 206 includes disks Hdisk1, Hdisk2, Hdisk3, Hdisk5, and Hdisk8. Each such Hdisk maps to a primary global mirrored UUID, for example Hdisk5 of primary VM 212 maps to UUID5. For each Hdisk that is a primary global mirrored disk, i.e. a source disk of a replication volume, its UUID is paired with a target global mirrored UUID, of a target disk of the replication volume, on secondary virtual machine 214 at secondary site 210. In this example, UUID2 for Hdisk2 of primary VM 212 is paired with UUID4 for Hdisk4 of secondary VM 214, UUID3 for Hdisk3 of primary VM 212 is paired with UUID10 for Hdisk10 of secondary VM 214, and UUID5 for Hdisk5 of primary VM 212 is paired with UUID12 for Hdisk12 of secondary VM 214. The example of FIG. 2 indicates replication involving only one primary VM and one secondary VM, however primary VM 212 may be one primary VM of several at the primary site, which each may be involved in a respective replication relationship with another secondary VM of several at the secondary site.

Not all data of the primary VM 212 is being replicated. Hdisk1 (UUID1) of primary VM 212 is not a GM disk because, in this case, it is the rootVG containing core system files and is therefore not mirrored. Hdisk8 (UUID8) of primary VM 212 is also not a replication volume and consequently is marked as ignored. The secondary VM 214 coincidentally also has five Hdisks in this example (e.g. Hdisk1, Hdisk4, Hdisk5, Hdisk10 and Hdisk12) though only three Hdisks (Hdisk4, Hdisk10 and Hdisk12) are mapped target GM UUIDs (i.e. UUID4, UUID10, UUID12 respectively).

Volume groups may be configured for the Hdisks of the virtual machines and a volume group can span two or more hard disks of a VM. The volume groups are configured by way of volume group configurations. For primary VM 212, a first volume group VG1, which is not replicated, is configured for Hdisk8 as VG1 configuration 230, a second volume group VG2, which is replicated, is configured for Hdisk2 as VG2 configuration 232, a third volume group VG3, which also is replicated, is configured for Hdisk3 and Hdisk5 as VG3 configuration 234 (the volume group spans these disks), and a fourth volume group rootVG 236 is configured for Hdisk1 and is not mirrored. A volume group can include/indicate one or more mount points for the associated Hdisks. The mount points are arranged hierarchically. Thus, mount point configuration information is also part of the volume group configuration. Volume group VG2 includes mount point MP1 and mount point MP2 at a common level of the hierarchy. Mount points MP20 and MP21 are children of mount point MP2. The mount point configuration information including file system, size, permissions, and possibly other configuration information is indicated for leaf mount points, in this case MP20 and MP21. The mirrored volume groups are configured also at the secondary site (see VG configurations 238 and 240 for VG2 and VG3, respectively, and thus their configurations are largely the exact same as the configurations at the primary site, except for the indicated Hdisks involved, which are specific to each site. The secondary site also has rootVG that is not mirrored but nonetheless configured 242.

Orchestrated disaster recovery described herein utilizes replication volume configuration information that identifies configurations for replication volumes, i.e. volumes that are replicated from replication source to replication target. Each replication volume has an associated source of the replicated data (Hdisk(s) of the replication source) and target of the replicated data (Hdisk(s) of the replication target). Data written to the primary site Hdisk is replicated to secondary site Hdisk. The replication volume configuration information indicates, among other information as described in further examples below, the volume group(s) involved in the data replication relationship(s) between the replication source site and the replication target site, and the parings of the Hdisks using their (partial) UUIDs. In also includes the mount point configuration information for each of the replicated volume groups.

The building of replication volume configuration information is triggered by a disaster recovery orchestrator (DRO) component/server 244 at the primary site, which triggers the primary virtual machine to build the information. The DRO is, for instance, a system (hardware and/or software) that captures information about which disks are replicated on DR-enabled virtual machines. The data is captured from a repository (e.g. a central management database) storing replication relationships in the form of pairing information that indicates the pairings of primary UUID to secondary UUID for the different replication volumes. Typically the UUIDs of the pairings are not full UUIDS but instead are partial UUIDs.

The DRO at the primary site provides this information to the primary VM(s) having one or more GM-involved Hdisks and the VMs then build the replication volume configuration information as described below. Both the primary and secondary sites may have a DRO component instance executing. The DRO at the secondary site can facilitate automated configuration of the replication volumes at the secondary site as is further described below. A DRO can keep track of which virtual machine(s) are disaster recovery enabled. In large cloud environments, there may be thousands of virtual machines running at a given site. It is possible that only a small number of those virtual machines have DR enabled, and an even smaller number of virtual machines that have GM enabled disks. Thus, a DRO at a primary site can query the repository to identify exactly which Hdisks (as identified by partial UUID) are GM enabled. This is used to trigger (by the DRO at the primary site) the building of relevant replication volume configuration information for the GM-involved Hdisks, volume groups, mount points, etc.

Further details of disaster recovery orchestration are now described herein in the context of three overall phases or steps. The first step involves capturing the information that the primary VM(s) can use to build the replication volume configuration information in the second step. The third step involves the use of that information at the secondary site to automatically configure (restore) the replication volumes for use by applications of the secondary VMs.

Step 1 (250 in FIG. 2):

Pairing information of mirrored disk UUIDs is stored in a repository, an example of which is a configuration management database (CMDB) 251. As an example, the CMDB stores global mirror (GM) disk pairing information 252. The pairing information is global mirrored disk mapping information between primary-secondary virtual machine pairs. For instance, for primary VM 212 and secondary VM 214, pairing information 252 indicates pairing between (i) UUID2 (primary) and UUID4 (secondary), UUID3 (primary) and UUID10 (secondary), and UUID5 (primary) and UUID12 (secondary). DRO 244 issues a query to CMDB 251 to capture these partial UUIDs of GM-involved disks at both the primary and secondary sites, and optionally additional information. In some examples, the CMDB is a dedicated machine at a third site remote from the primary and the secondary sites.

Below is an example query to request disk pairing information from the repository, in accordance with aspects described herein:

```
SELECT disk.uuid, (select UUID from machine.sppc_vm_disk vmdisk
WHERE
vmdisk.sppc_vm_diskid=pair.disk_id_secondary)
FROM machine.sppc_dm_disk_pair pair
LEFT JOIN machine.sppc_vm_disk disk ON
disk.sppc_vm_diskid=pair.disk_id_primary
LEFT JOIN machine.sppc_vm vm on disk.vm_id=vm.sppc_vmid
WHERE pair.disk_id_primary is not null and vm.UUID="'+priUUID+'"
```

This last WHERE statement includes an appended VM UUID as a filter with priUUID being the UUID for a primary virtual machine, in order to filter the output by specific virtual machine.

The query is hooked into file generator code to generate file(s), such as .CSV file(s). The generator code can run periodically on the DRO server 244 to generate a file containing the relevant pairing information and additional information. Each row in the data file can be a list of comma-separated-values. The CSV file resides on the DRO server 244 and contains the information about the VMs that are disaster recovery enabled. It can include any desired information available to the DRO server 244 by way of the query or otherwise to inform of the subject virtual machines and UUIDs that are relevant to DR. Example information includes, but is not limited to, name, address (internet protocol address), site location, number of disks, customer name, secondary hostnames, and secondary virtual machine partial UUIDs.

Example CSV file data follows:

```
3ec46316-7635-47cc-b6e8-8c2126f9d169,
203.0.113.11,RTP,RTPPOD1,mmmZ78RTP1211,RTPPRI-
MARY1:RTPPRIMARY2:RTPPRIMARY3,490f5fc4-5b93-
44b2-b3ee-7763aa8dc7a1,
203.0.113.11,BLD,BLDPOD1,mmmZ78BLD1211,BLDPRI-
MARY1:BLDPRIMARY2:BLDPRI-
MARY3,mmmZ78RTP1211_CG1_10:
mmmZ78RTP1211_CG2_10,Q78,AIX,3,AAwGM,BLDSVC2
```

The DRO component 244 generates, based on the results of the queries, GM disk information that is utilized by the DR-involved primary VMs utilizing a GM-involved HDisk as explained below.

Example GM disk information follows:

```
File Name : mmm31q72200c.gts.abc.com_2014-08-12__05_10_59
  priVM_UUID="xY.rip2mRCuyZhyOTCaNFw"
  secVM_UUID="wEA5AF1wQeiMHUCh609Cwg"
  priVM_IPAddr="203.0.113.11"
  secVM_IPAddr="203.0.120.10"
  priVM_HostName="mmm31q72200c.gts.abc.com"
  secVM_HostName="mmm31q72200c.gtb.abc.com"
  numGMDisks="3"
  gmTimestamp="2015-08-01::16:11:48"
  priVM_DISK_1="60050768018106001A800000000000E2C"
  secVM_DISK_1="60050768018086F268000000000000D9"
  priVM_DISK_2="60050768018105FE2000000000000FFD"
  secVM_DISK_2="60050768018086F2080000000000006F"
  priVM_DISK_3="60050768018106001A800000000000E7A"
  secVM_DISK_3="60050768018086F268000000000000EC"
  End_Of_Server_File="true"
```

As is seen from the above example, the GM disk information includes primary and secondary VM UUIDs, IP addresses, and hostnames. It also indicates the number of GM disks (replication volumes—termed DISK 1, DISK 2, and DISK 3 in this example) and the source (primary VM Hdisk) and target (secondary VM Hdisk) for each replication volume. If there are multiple primary virtual machines and secondary virtual machines included in data replication, then additional GM disk information will be generated and maintained either together with the above information or in separate file(s).

The relevant GM disk information will be used on each primary VM that is participating in DR as described in connection with Step 2 below. In some embodiments, the GM disk information corresponding to a particular primary VM can be automatically provided to, or obtained by, the primary VM. In other embodiments, the GM disk information is transferred from the DRO (244) to a client virtual machine as follows:

Use the scp command over an already-opened port (such as port 22) using a network layer (such as frontbone) to transfer data from the DRO to the client VM. The DRO will push/transmit the data to the client VM using scp as a preestablished user, such as "orchdro";

Source: will be created on the fly by user orchdro via java code;

Source location: /home/orchdro/data/hostname.cmdb (primary VM);

Destination folder: /home/orchdro/autoMount (primary VM);

owner: orchdro filename: $HOSTNAME.cmdb contents: info captured from CMDB about disk mirroring between primary and secondary VM.

Step 2 (253 in FIG. 2):

The primary VMs that are DR-enabled with a GM-involved HDisk use the paring information captured in step 1 and provided by the DRO server to gather the appropriate replication volume configuration information 254 to support orchestrated DR in accordance with aspects described herein. The relevant information resides in the primary VMs and the replication volume configuration information is built via, in these examples, a discovery script referred to herein as autoMountDiscovery.sh. The discovery script is to be run on each such primary VM, which uses the GM disk information relevant to the primary VM to create the configuration file 254 containing information usable to fully configure the appropriate volume groups, logical volumes, file system and mount points on the corresponding secondary VM.

Information built into the replication volume configuration information 254 includes, but is not necessarily limited to: for each volume group of each primary virtual machine, the VG name, primary-secondary Hdisk pairs indicated by partial-UUID, number of Hdisks, and mount point configuration information including name, file system, size, read/write options, automount options, and number of mount points.

An outline of an example algorithm for the autoMountDiscovery.sh script is provided below:

For each volume group on the VM, use 'lspv' to find Hdisks associated with it;
Use 'odmget' to find the full UUID for each disk associated with the VG;
Check whether that disk is global mirrored (using information captured in Step 1 based on CMDB query);
If disk is global mirrored, then find all file systems on that Hdisk using 'lsvgfs'; and
For each mount point of the VG, capture all required information using 'lsfs'.

Processing on the primary VM identifies Hdisks, VGs, and LVs in source operating systems of the primary VM. A volume group can span multiple disks, so information of all involved disks is captured and stored in the replication volume configuration information file. The processing loops around for each logical volume, and for each mount point saves its size, file system, read/write options, automount options, and any other desired information. By way of specific example, "VgMount in $(lsvgfs $VgName)" is an example that uses the lsvgfs command to get a mount point name. 'lsvgfs' is a known operating system command and the $VGName is the name of the particular volume group. The above statement accesses the volume group information and puts it into a variable called VGmount. That variable is then used to obtain information about the mount point: mpInfo=$(lsfs|grep $VgMount), which uses the lsfs command and captured mount point name.

Example mpInfo contents include, with examples:

Output of the discovery script is stored at least initially in the primary VM generating it. The script can have various configurable parameters including but not limited to:
output file name;
default location;
log file;
cleanup_file_age (number of days to keep log files);
base_dir (location on VM system containing all required auto mount files);
cfg_file_name (name of output/replication volume confirmation information file containing required info;
cmdb_file_name (name of CMDB file containing GM disk pairing info generated in step 1);
log_file_name (log file located in $base_dir and pointing to latest log file. Timestamped log files may be created and stored in $base_dir/logs with the file name having soft link to the latest one);
debugMe (debugging flag—set to 1 to print extra debug information on the console).

The following shows example configurations for the parameters:

```
#####configurable parameters#####
  #delete files older than x number of days (>0)
  cleanup_file_age=90
  #basic director structure
  base_dir="/home/orchdro/autoMount"
  #config / discovery file : stored in $base_dir pointing to latest file
  cfg_file_name=autoMountDiscovery.cfg
  #cmdb file name.
  ##Default : if left blank, this script will look for 'hostname'.cmdb.
  ##DRO server will have this named after primaryVM host name.
  cmdb_file_name='hostname'.cmdb
  #log file : stored in $base_dir pointing to latest log
  log_file_name=autoMountDiscovery.log
  #Debug : You can pass debug / Debug / DEBUG as parameter to this
  function or set this variable
  #debugME=1
  debugME=0
  ##### End of Configurable parameters #####
```

The following is an example output obtained based on running the automount discovery script, i.e. example replication volume configuration information generated by step 2 and indicated by 254 in FIG. 2.

```
system_date="2015-08-01::22:42:40"
priVM_UUID="xY.rip2mRCuyZhyOTCaNFw"
secVM_UUID="wEA5AF1wQeiMHUCh609Cwg"
priVM_IPAddr="203.0.113.11"
```

| Name | Nodename | Mount pt | VFS | Size | Options | Auto | Accounting |
|---|---|---|---|---|---|---|---|
| /dev/lv_abc | --- | /oracle/xyz | jfs2 | 524288 | rw | yes | no |

As described above, the autoMountDiscovery.sh script is run by a primary VM 212 using the information passed from the DRO server 244, and the primary VM 212 generates the replication volume configuration information file with information pertaining that that primary VM. The automount discovery script need not be run periodically or even frequently. Instead, it may be initiated whenever there is a change in a global mirror that would affect a data replication relationship. In that case, this change will be discovered via step 1 and can trigger (automatically or with user intervention) re-running the automount discovery script.

-continued

```
secVM_IPAddr="203.0.120.10"
priVM_HostName="mmm31q72200c.gts.abc.com"
secVM_HostName="mmm31q72200c.gtb.abc.com"
numGMDisks="3"
gmTimestamp="2014-08-12::05:10:59"
VG_1_HdPriVmUUID_1="6005076801810601A800000000000E2C"
VG_1_HdSecVmUUID_1="60050768018086F268000000000000D9"
VG_1_HdName_1="hdisk1"
VG_1_HdCount="1"
VG_1_name="one_vg"
```

-continued

```
VG_1_mpCount="0"
VG_2_HdPriVmUUID_1="60050768018105FE2000000000000FFD"
VG_2_HdSecVmUUID_1="60050768018105FE2000000000000FFD"
VG_2_HdName 1="hdisk6"
VG_2_HdPriVmUUID_2="6005076801810601A800000000000E7A"
VG_2_HdSecVmUUID_2="6005076801810601A800000000000E7A"
VG_2_HdName_2="hdisk7"
VG_2_HdCount="2"
VG_2_name="two_vg2"
VG_2_mpName_1="/twovg2"
VG_2_mpVFS_1="jfs2"
VG_2_mpSize_1="2097152"
VG_2_mpRWO_1="rw"
VG_2_mpAutoMount_1="yes"
VG_2_mpName_2="/twovg22"
VG_2_mpVFS_2="jfs2"
VG_2_mpSize_2="2097152"
VG_2_mpRWO_2="rw"
VG_2_mpAutoMount_2="yes"
VG_2_mpName_3="/twovg2/twovg22"
VG_2_mpVFS_3="jfs2"
VG_2_mpSize_3="--"
VG_2_mpRWO_3="rw"
VG_2_mpAutoMount_3="yes"
VG_2_mpCount="3"
VgCount="2"
End_Of_Discovery_File="true"
```

In the above example, there is no mount point in VG1, but there are several ("/twovg2", "/twovg22", and "/twovg2/twovg22") in VG2.

The information above provides the information that is used at the secondary site to fully-configure the replication volumes on the replication target, including volume group(s) and mount points(s) for the replication volumes.

A periodic or non-periodic VM health check can be performed as part of this process to check the connections between the DR-enable primary virtual machine(s) and the DRO server. This can help ensure that the connections exist, the login/password information has not been changed, etc. As part of the periodic VM health check, the DRO performs the following actions, as examples:

1. Query CMDB to obtain Global Mirror source and target disk UUIDs;
2. Log on to primary client VM that has GM and collect mount points, Hdisk names, volume groups, etc. as described above;
3. Validate sanity of cmdb file (it is a variable that can be set in the beginning of the script). This can check whether the file is complete (i.e. the program did not crash while it was being generated), e.g. by checking for the variable the variable: End_Of_Server_File="true";
4. Validate sanity of cfg file (also a variable that can be set in the beginning of script). This can check whether the file is complete (i.e. the program did not crash while it was being generated), e.g. by checking for the variable the variable: End_Of_Discovery_File="true";
5. Validate values extracted from cfg file for VG, LV, and mount points. As an example, the values are validated as being non-NULL, though this could be enhanced to check against operating system and/or company standards;
6. Gracefully exit: In case of error/failure, log files are created and point to the latest one.

Step 3 (256 in FIG. 2):

At some point after the replication volume configuration information 254 is built, it is transferred from the primary site 206 to the secondary site 210. In some examples, it is transferred from the primary VM to the secondary VM that is in the data replication relationship with the primary VM that built the configuration information. Alternatively, the configuration information could be provided to a separate component, such as a DRO of the primary site and/or secondary site, for provision to the secondary VM. This information is used during failover from the replication source site to the replication target site. The failover is a trigger to perform a restore using the replication volume configuration information. The replication volume configuration information includes the needed information to complete the configuration of the replication volumes for the replication target. For instance, the secondary VM can use the information to configure the appropriate components in preparation for their use by, e.g. application(s) that are run at the replication target site. Configuring the replication volumes for the replication target includes fully configuring, for components such as operating system(s) of the secondary VM, the volume groups, logical volumes, file systems, and mount points as they were at the primary site.

The processing to effect the restore at the secondary site 210 is based on some indication of failover. When disaster happens, some entity having authority, such as an administrator or an automated attendant, declares disaster on the primary site. This indicates a failover is to occur. Each DR-enabled secondary VM with a GM disk can run an appropriate restore script as described below. In some examples, the declaration of disaster is automated based on lapse of a predefined time frame (such as 5 minutes) after an initial indication of a catastrophic problem.

In some embodiments, the DRO 258, responsive to the indication of failover, logs onto the DR-enabled secondary VM with a GM disk and checks for the Hdisks that correspond to each target disk UUID indication in the replication volume configuration information. This is done because the target disk UUID may be only a partial UUID as discussed below. Then, DRO 258 initiates execution of an autoMountRestore.sh script to restore volume groups 238 and 240, the mount points, files systems, etc. on the secondary VM. The script uses the replication volume configuration information 254 built in step 2 to perform the restore. The user (under which DRO 258 accesses the secondary VM) may need root or superuser permissions to effect the restore. The script can validate sanity of the replication volume configuration information file if a configuration parameter of the script indicates. It also can validate values extracted from the configuration information for volume groups, logical volumes, and mount points. Finally, the script gracefully exits. Log file(s) can be created for the session and errors or failures can be logged.

At the secondary virtual machine 214, a full Hdisk name lookup may be needed. The disk pairing information included in the replication volume configuration information 254 is derived from the CMDB 251, which may save only partial UUIDs of Hdisks. However, the fully qualified disk name may be needed for the secondary VM 214. To address this, a multi-step reverse lookup is proposed.

As a first step, the full UUID of the disk on the VM 214 may be determined by filtering all IDs on the VM 214 via odmget:

```
hdFullUUID=$( odmget -q "attribute=unique_id" CuAt | awk -F\" '$1 ~/value/{print $2}' | grep $vgHdUUID_SecVM )
```

The above captures the full UUID using the partial UUID from CMDB 251 (via the configuration information 254).

As a second step, the full UUID for a disk is then used to determine the corresponding disk name (HdiskX) via odmget. This is performed because operating systems may use only disk names rather than UUIDs for volume groups:

```
vgHdName=$( odmget -q "attribute=unique_id and value=$hdFullUUID"
CuAt |awk -F\" '$1 ~/name/{print $2}' )
```

The above obtains the Hdisk name using the full UUID just captured.

Based on determining the proper Hdisks correlating to the partial UUIDs indicated in the replication volume configuration information, all of the information needed for the secondary VM 214 to fully configure the replication volume(s) for the replication target has been obtained. The information is provided to/for the secondary VM 214, and the script is triggered to run to perform the configuration.

As described above, it may be desired to avoid mount conflicts in which existing locally mounted storage (12) conflicts with mount point(s) that are to be mounted as part of the failover to the replication target site. An auto-unmount/mount aspect of the restore can check for conflict(s) between mount points of what is currently mounted on the secondary VM but not involved in replication and what needs to be mounted for DR failover purposes, as indicated by the replication volume configuration information. In the event of a conflict, an existing conflicting mount is automatically unmounted. Based on that, the mount point needed under the DR failover can be mounted Further details are provided for an example autoMount-Restore.sh script. The script can have various configurable parameters including, but not limited to:
  cleanup_file_age—Number of days to keep log files
  base_dir—location on secondary VM system containing auto mount files
  cfg_file_name—Name of replication volume configuration information file (generated in step 2). This should be stored in base_dir.
  log_file_name—log file located in $base_dir and pointing to latest log file. All timestamped log files will be created/stored in $base_dir/logs but this file name can have a soft link to the latest one.
  debugMe—set it to 1 to print extra debug info on console The following shows example configurations for the parameters:

```
#####configurable parameters#####
#delete files older than x number of days (>0)
cleanup_file_age=90
#basic director structure
base_dir="/home/orchdro/autoMount"
#config / discovery file : stored in $base_dir pointing to latest file
cfg_file_name=autoMountDiscovery.cfg
#log file : stored in $base_dir pointing to latest log
log_file_name=autoMountRestore.log
#Debug : You can pass debug / Debug / DEBUG as parameter to this
function or set this variable
#debugME=1
debugME=0
End of Configurable parameters #####
```

In some embodiments, the global mirroring disk information is automatically generated periodically, such as daily, on the DRO server 244 at the primary site 206. It may be manually or automatically moved onto a primary VM 212 based on occurrence of a change in volume(s) involved in the pairings. An autoMountDiscovery script may be manually triggered to execute on the primary VM 212 based on any such change in the paired volumes. Alternatively, execution of the script can be scheduled as cron-job to automatically run. The replication volume configuration information hence generated based on executing the script is saved and/or transferred (manually or automatically) to the secondary site 210, such as a secondary VM 214 thereof or a component (e.g. 258) that provides the information to the secondary VM 214. The transferred replication volume configuration information is for use as described above in the event of a failover to configure the replication volume(s) for the replication target. Secure SSH or other remote access facility in conjunction with automated functional IDs can facilitate transfer of the appropriate information between components, such as between a DRO and a virtual machine or between a virtual machine and another virtual machine.

Use of orchestrated DR as described herein can lower the cost of DR implementations by allowing secondary VMs to be used during their non-DR mode (i.e. in an active/active situation) with the non-mirrored file system structure being the same as on the primary VM, which will be replaced automatically with the replicated file system at time of automount. That is, the secondary machine can be actively using a local copy of a mount point that is also being replicated from the primary server. At the time of disaster, the automount script can unmount this local mount point, and mount the replicated storage to that same mount point. This allows an application that is using the storage to avoid having to use two separate mount points. Orchestrated DR can achieve much lower RTO than existing methods, and optionally without any administrator intervention to collect the automount data, correlate mount points on the primary VM with global mirrored disks, copy files, or execute the automount at the secondary site at Time of Disaster (TOD). The process can be much less error prone because of its automated features. This also provides opportunities to monitor the configuration information or other data being passed in various steps above, which provide early indicators of possible problems at DR time.

Figure 3:
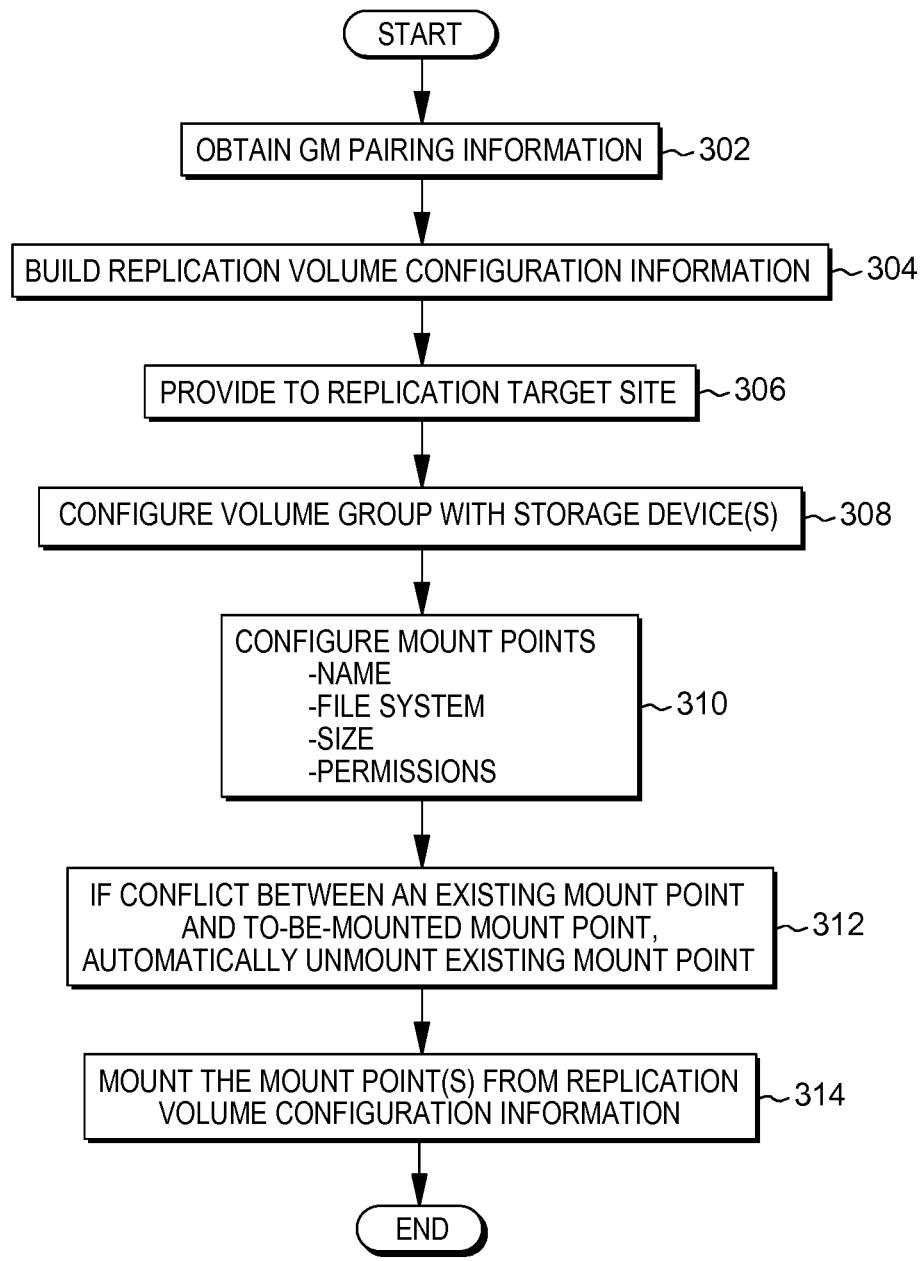
FIG. 3 depicts an example process for orchestrated disaster recovery, in accordance with aspects described herein.
Figure 4:
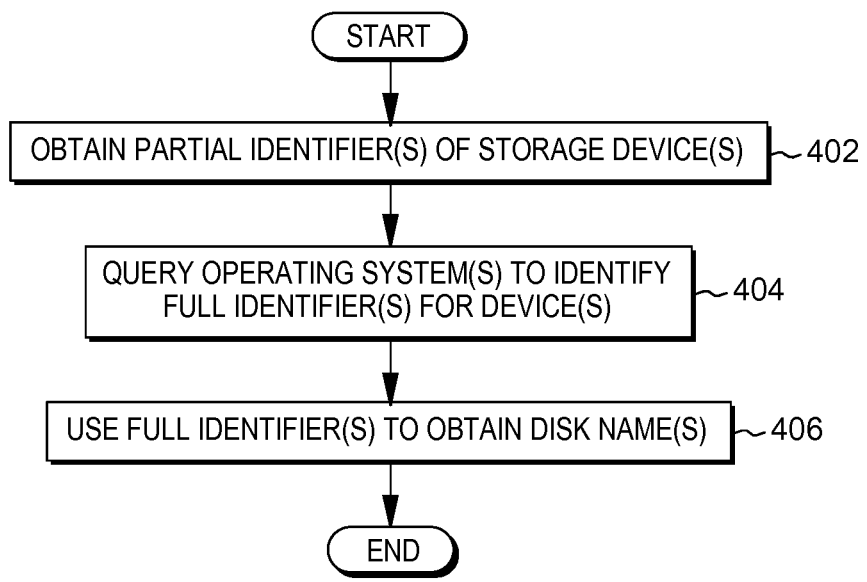
FIG. 4 depicts an example process to complete a partial identifier of a storage device, in accordance with aspects described herein.

Accordingly, FIGS. 3 & 4 depict example processes performing aspects described herein. FIG. 3 depicts an example process for orchestrated disaster recovery, in accordance with aspects described herein, which includes automatic configuration of replication volumes as part of a failover procedure. Aspects of the process of FIG. 3 are performed by varying components, such as DRO components and/or virtual machines at the replication source and replication target sites.

The process begins by obtaining global mirror pairing information (302). The information is obtained at least partially from a repository storing replication relationships. The pairing information includes identifiers that identify a replication source storage device (e.g. Hdisk) and replication target storage device (e.g. Hdisk). The pairing information is obtained from the repository by a component at the replication source site, such as a DRO component of the replication source site. Based on obtaining this information, replication volume configuration information is built (304) by, e.g., a virtual machine of the replication source site. The replication volume configuration information identifies configuration of replication volume(s) in a data replication relationship between the virtual machine (as a primary virtual machine) and another virtual machine (a secondary virtual machine, at the replication target site), in which data is replicated from the a replication source of the replication source site to a replication target of the replication target site. The replication volume(s) are configured for the replication source and, at this point in the process, remain at least partially non-configured for the replication target during normal data replication from the replication source to the replication target.

The replication volume configuration information includes the information to be used later to fully configure replication volumes for the replication source. This includes, as examples, volume group, logical volume, and mount point information including file system, size, permission, and automount information about the replication source storage device. This information is resident in the virtual machine and can thus be automatically assembled based on execution of a script. The script can rely on the previously obtained pairing information to identify the replication source storage devices that are relevant for DR, and on this basis the configuration(s) of one or more storage device(s) of the replication source site are ignored in building the replication volume configuration information.

Continuing with FIG. 3, the process provides the built replication volume configuration information to the target site (306). Thus, a component of the replication target site, e.g. the virtual machine or another component such as a DRO at the replication target site, obtains the built replication volume configuration information from the replication source site. The information is obtained from a primary virtual machine or the DRO server at the replication source site, as examples. It is obtained by a component of the replication target site, for instance a secondary virtual machine that is DR-enabled with GM disk and is to use the information on failover of the replication source site. The configuration information may be obtained directly or by way of the DRO at the replication target site, as examples.

Based on an indication of failover from the replication source site to the replication target site, the replication volume configuration information is used to automatically configure the replication volume(s) for the replication target in preparation for use by application(s) of the replication target site. In one example, process(es) of the secondary virtual machine automatically configures this using the obtained replication volume configuration information. The automatically configuring the replication volume(s) for the replication target based on the failover configures the replication volume(s) using the volume group, logical volume, and mount point information of the replication volume configuration information. The automatically configuring includes configuring, for the replication volume(s), volume group(s) (310) and mount point(s) (312). Configuring the volume group(s) includes configuring for the replication target a volume group having storage device(s) and configuring the mount point(s) of the volume group. The configuring the mount point(s) (310) includes configuring name, file system, size, and permission options of the mount point(s).

The automatically configuring the replication volumes can also include mounting the mount points. In this regard, and auto-unmount/mount process may be used, in which initially it is determined whether any conflicts are presented between existing mount point(s) of the replication target site (such as those that are supporting a supplementary workload and are thus considered non-priority) and the to-be-mounted mount points from the replication volume configuration information. If any conflicts exist, the process automatically unmounts the conflicting existing mount point(s) (312), and then mounts the mount points from the configuration information (314) and the process ends.

Since data replication relationships can exist between many primary-secondary machine pairs, the process can automatically configure several replication volumes for several replication targets. The replication source site can include a plurality of primary virtual machines in data replication relationship(s) with a plurality of corresponding secondary virtual machines of the replication target site to which the failover is to occur. The replication volume configuration information can include replication volume configuration information specific to each primary virtual machine of the plurality of primary virtual machines, either as a single file or in multiple files. The automatically configuring the replication volume(s) for the replication target can thus include automatically configuring on each secondary virtual machine of the plurality of secondary virtual machines a respective one or more volume group(s) and mount point(s) of a corresponding primary virtual machine of the plurality of primary virtual machines.

In some examples, use of the replication volume configuration information includes completing partial identifiers of the involved storage devices. The obtained replication volume configuration information might include only a partial identifier for a storage device of the replication target. FIG. 4 depicts an example process to complete a partial identifier of a storage device, in accordance with aspects described herein. The process may be obtained by a component(s) of the replication target site, such as a DRO component and/or secondary virtual machine. Initially, the partial identifier of the storage device is obtained from the obtained replication volume configuration information (402) and an operating system of the replication target site (e.g. a secondary virtual machine of which the device is a part) is queried to identify a full identifier for the storage device (404). Using the full identifier for the storage device, a disk name (e.g. Hdisk name) for the storage device is obtained (406) again from the operating system, and the process ends. During the automatic configuration, that disk name may be used to configure a volume group of the volume group(s) being automatically configured at the replication target site.

Processes described herein may be performed singly or collectively by one or more computer systems. In some examples, such a computer system that performs process(es) described herein is a computer system that is part of a replication source site or replication target site.

Figure 5:
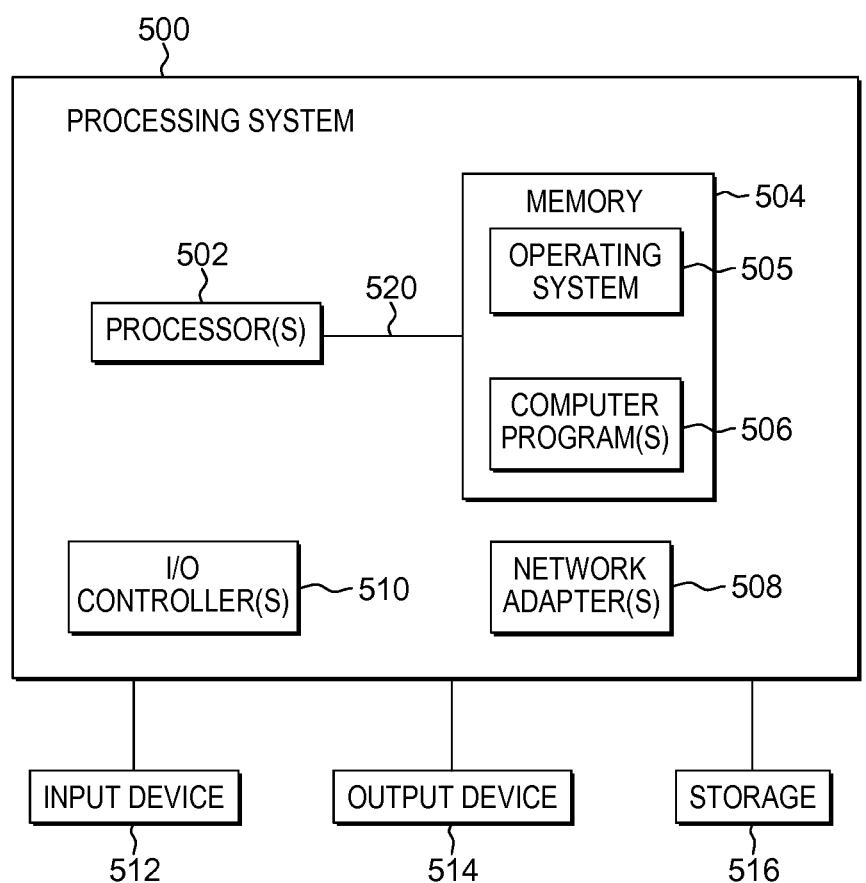
FIG. 5 depicts an example of a computer system to incorporate and use aspects described herein.

FIG. 5 depicts one example of a computer system to incorporate and use aspects described herein. A computer system may also be referred to herein as a processing device/system or computing device/system, or simply a computer. Computer system 500 may be based on one or more of various system architectures such as those offered by International Business Machines Corporation (Armonk, N.Y., USA) or Intel Corporation (Santa Clara, Calif., USA), as examples.

Computer system 500 is suitable for storing and/or executing program code and includes at least one processor 502 coupled directly or indirectly to memory 504 through, e.g., a system bus 520. In operation, processor(s) 502 obtain from memory 504 one or more instructions for execution by the processors. Memory 504 may include local memory employed during actual execution of the program code, bulk storage, and cache memories which provide temporary storage of at least some program code in order to reduce the number of times code must be retrieved from bulk storage during program code execution. A non-limiting list of examples of memory 504 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 504 includes an operating system 505 and one or more computer programs 506, for instance programs to perform aspects described herein.

Input/Output (I/O) devices 512, 514 (including but not limited to displays, microphones, speakers, accelerometers, gyroscopes, magnetometers, light sensors, proximity sensors, GPS devices, cameras, etc.) may be coupled to the system either directly or through I/O controllers 510.

Network adapters 508 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 508 used in computer system.

Computer system 500 may be coupled to storage 516 (e.g., a non-volatile storage area, such as magnetic disk drives, optical disk drives, a tape drive, etc.), having one or more databases. Storage 516 may include an internal storage device or an attached or network accessible storage. Computer programs in storage 516 may be loaded into memory 504 and executed by a processor 502 in a manner known in the art.

The computer system 500 may include fewer components than illustrated, additional components not illustrated herein, or some combination of the components illustrated and additional components. Computer system 500 may include any computing device known in the art, such as a mainframe, server, personal computer, workstation, laptop, handheld or mobile computer, tablet, wearable device, telephony device, network appliance, virtualization device, storage controller, etc.

Figure 6:
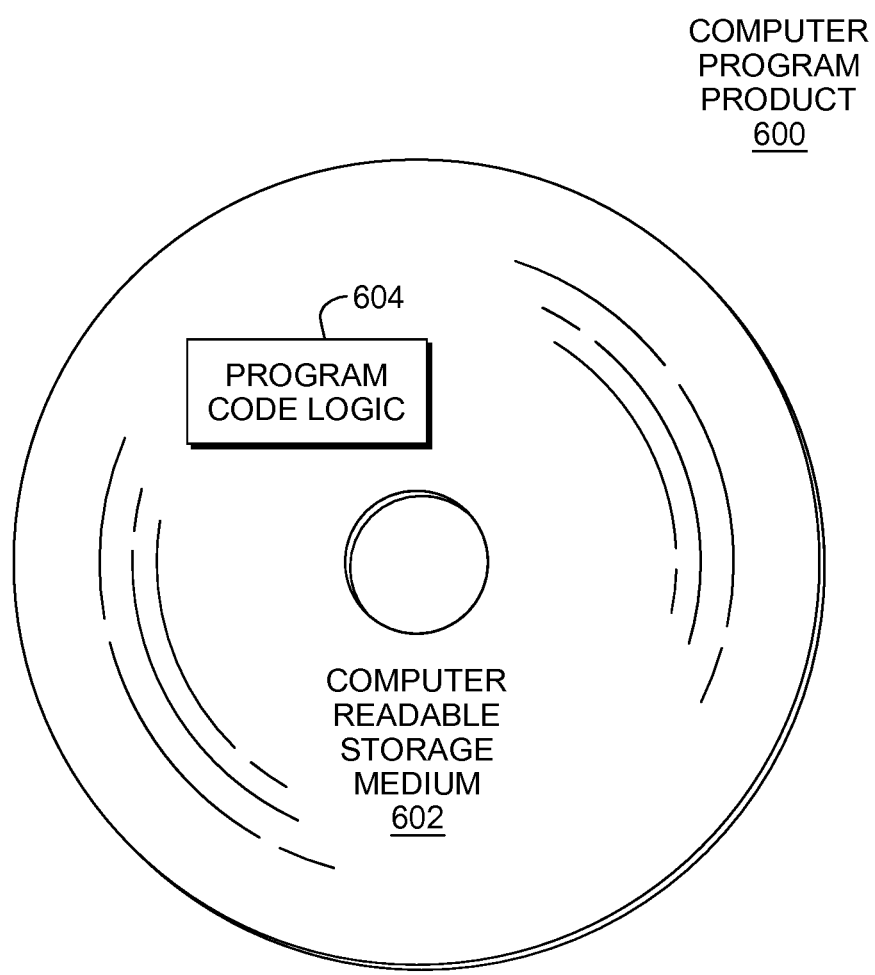
FIG. 6 depicts one embodiment of a computer program product.

Referring to FIG. 6, in one example, a computer program product 600 includes, for instance, one or more computer readable storage media 602 to store computer readable program code means, logic and/or instructions 604 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method for automatically configuring replication volumes as part of a failover procedure, the method comprising:
   obtaining replication volume configuration information identifying configuration of at least one replication volume in a data replication relationship in which data is replicated from a replication source to a replication target, wherein the at least one replication volume is configured for the replication source and the at least one replication volume remains at least partially non-configured for the replication target during data replication from the replication source to the replication target, wherein obtaining the replication volume configuration information comprises obtaining the replication volume configuration information from the replication source site, the replication volume configuration information being built by a component of the replication source site and being built based on pairing information obtained at least partially from a repository storing replication relationships, wherein the pairing information identifies a replication source storage device and replication target storage device, wherein the replication volume configuration information comprises volume group, logical volume, and mount point information, including file system, size, permission, and automount information, about the replication source storage device; and
   based on an indication of failover from a replication source site to a replication target site, automatically configuring, using the obtained replication volume configuration information, the at least one replication volume for the replication target in preparation for use by an application of the replication target site, wherein the automatically configuring the at least one replication volume for the replication target based on the failover configures the at least one replication volume using the volume group, logical volume, and mount point information, and the automatically configuring includes configuring, for the at least one replication volume, at least one volume group and at least one mount point.

2. The method of claim 1, wherein configuring the at least one volume group comprises configuring for the replication target a volume group having one or more storage devices and configuring one or more mount points of the volume group.

3. The method of claim 1, wherein configuring the at least one mount point comprises configuring a name, file system, size, and permission options of the at least one mount point.

4. The method of claim 1, further comprising:
   determining, as part of the configuring the at least one mount point, whether mounting a mount point of the at least one mount point presents a conflict with an existing mount point of the replication target site; and
   based on determining that mounting the mount point presents a conflict, automatically unmounting the existing mount point and mounting the mount point.

5. The method of claim 1, wherein the obtained replication volume configuration information comprises a partial identifier of a storage device of the replication target, and wherein the using the obtained replication volume configuration information comprises:
   obtaining, from the obtained replication volume configuration information, the partial identifier of the storage device;
   querying an operating system of the replication target site to identify a full identifier for the storage device;
   using the full identifier for the storage device to obtain a disk name for the storage device; and
   using the disk name to configure a volume group of the at least one volume group.

6. The method of claim 1, wherein on the basis of the pairing information, configuration of at least one storage device of the replication source site is ignored in building the replication volume configuration information.

7. The method of claim 1, wherein the replication source site comprises a plurality of primary virtual machines and the replication target site comprises a plurality of corresponding secondary virtual machines to which the failover is to occur, wherein the replication volume configuration information comprises replication volume configuration information specific to each primary virtual machine of the plurality of primary virtual machines, and wherein the automatically configuring the at least one replication volume for the replication target comprises automatically configuring on each secondary virtual machine of the plurality of secondary virtual machines a respective at least one volume group and at least one mount point of a corresponding primary virtual machine of the plurality of primary virtual machines.

8. A computer system comprising:
a memory; and
a processor in communication with the memory, wherein the computer system is configured to perform a method, the method comprising:
obtaining replication volume configuration information identifying configuration of at least one replication volume in a data replication relationship in which data is replicated from a replication source to a replication target, wherein the at least one replication volume is configured for the replication source and the at least one replication volume remains at least partially non-configured for the replication target during data replication from the replication source to the replication target, wherein obtaining the replication volume configuration information comprises obtaining the replication volume configuration information from the replication source site, the replication volume configuration information being built by a component of the replication source site and being built based on pairing information obtained at least partially from a repository storing replication relationships, wherein the pairing information identifies a replication source storage device and replication target storage device, wherein the replication volume configuration information comprises volume group, logical volume, and mount point information, including file system, size, permission, and automount information, about the replication source storage device; and
based on an indication of failover from a replication source site to a replication target site, automatically configuring, using the obtained replication volume configuration information, the at least one replication volume for the replication target in preparation for use by an application of the replication target site, wherein the automatically configuring the at least one replication volume for the replication target based on the failover configures the at least one replication volume using the volume group, logical volume, and mount point information, and the automatically configuring includes configuring, for the at least one replication volume, at least one volume group and at least one mount point.

9. The computer system of claim 8, wherein configuring the at least one volume group comprises configuring for the replication target a volume group having one or more storage devices and configuring one or more mount points of the volume group.

10. The computer system of claim 8, wherein configuring the at least one mount point comprises configuring a name, file system, size, and permission options of the at least one mount point.

11. The computer system of claim 8, wherein the method further comprises:
determining, as part of the configuring the at least one mount point, whether mounting a mount point of the at least one mount point presents a conflict with an existing mount point of the replication target site; and
based on determining that mounting the mount point presents a conflict, automatically unmounting the existing mount point and mounting the mount point.

12. The computer system of claim 8, wherein the obtained replication volume configuration information comprises a partial identifier of a storage device of the replication target, and wherein the using the obtained replication volume configuration information comprises:
obtaining, from the obtained replication volume configuration information, the partial identifier of the storage device;
querying an operating system of the replication target site to identify a full identifier for the storage device;
using the full identifier for the storage device to obtain a disk name for the storage device; and
using the disk name to configure a volume group of the at least one volume group.

13. A computer program product comprising:
a computer readable storage medium readable by a processor and storing instructions for execution by the processor for performing a method comprising:
obtaining replication volume configuration information identifying configuration of at least one replication volume in a data replication relationship in which data is replicated from a replication source to a replication target, wherein the at least one replication volume is configured for the replication source and the at least one replication volume remains at least partially non-configured for the replication target during data replication from the replication source to the replication target, wherein obtaining the replication volume configuration information comprises obtaining the replication volume configuration information from the replication source site, the replication volume configuration information being built by a component of the replication source site and being built based on pairing information obtained at least partially from a repository storing replication relationships, wherein the pairing information identifies a replication source storage device and replication target storage device, wherein the replication volume configuration information comprises volume group, logical volume, and mount point information, including file system, size, permission, and automount information, about the replication source storage device; and
based on an indication of failover from a replication source site to a replication target site, automatically configuring, using the obtained replication volume configuration information, the at least one replication volume for the replication target in preparation for use by an application of the replication target site, wherein the automatically configuring the at least one replication volume for the replication target based on the failover configures the at least one replication volume using the volume group, logical volume, and mount point information, and the automatically configuring includes configuring, for the at least one replication volume, at least one volume group and at least one mount point.

14. The computer program product system of claim 13, wherein configuring the at least one volume group comprises configuring for the replication target a volume group having one or more storage devices and configuring one or more mount points of the volume group, and wherein configuring the at least one mount point comprises configuring a name, file system, size, and permission options of the at least one mount point.

15. The computer program product of claim 13, wherein the method further comprises:
- determining, as part of the configuring the at least one mount point, whether mounting a mount point of the at least one mount point presents a conflict with an existing mount point of the replication target site; and
- based on determining that mounting the mount point presents a conflict, automatically unmounting the existing mount point and mounting the mount point.

\* \* \* \* \*